US006281895B1

(12) United States Patent
Jeong

(10) Patent No.: US 6,281,895 B1
(45) Date of Patent: Aug. 28, 2001

(54) LEVEL ADJUST DISPLAY APPARATUS AND METHOD FOR ON-SCREEN DISPLAY MENU IN IMAGE DISPLAY DEVICE

(75) Inventor: Seok Hwa Jeong, Kumi (KR)

(73) Assignee: LG Electronics, Inc. (KR)

( * ) Notice: Subject to any disclaimer, the term of this patent is extended or adjusted under 35 U.S.C. 154(b) by 0 days.

(21) Appl. No.: 09/229,881

(22) Filed: Jan. 14, 1999

(30) Foreign Application Priority Data

Aug. 4, 1998 (KR) .......................................... 1998-31734

(51) Int. Cl.[7] ............................... G06F 3/14; H04N 5/44

(52) U.S. Cl. ........................ 345/339; 345/352; 345/901; 348/563; 348/569

(58) Field of Search .................................. 345/326, 160, 345/157, 168, 150, 352, 231, 132, 339; 348/569, 563, 564, 570

(56) References Cited

U.S. PATENT DOCUMENTS

| | | | | |
|---|---|---|---|---|
| 3,603,729 | * | 9/1971 | Sperber | 348/154 |
| 5,838,386 | * | 11/1998 | Kim | 348/569 |
| 5,880,814 | * | 3/1999 | McKnight et al. | 351/239 |
| 5,990,940 | * | 11/1999 | Hashimoto et al. | 348/184 |
| 6,037,998 | * | 3/2000 | Usui et al. | 348/569 |
| 6,078,361 | * | 6/2000 | Reddy | 348/558 |

* cited by examiner

*Primary Examiner*—John Cabeca
*Assistant Examiner*—Kieu D. Vu
(74) *Attorney, Agent, or Firm*—Ostrolenk, Faber, Gerb & Soffen, LLP

(57) ABSTRACT

A level adjust display apparatus and method for an on-screen display (OSD) menu of an image display device which displays function control targets in the form of an OSD menu on a screen is disclosed. The apparatus includes a key input unit including a vertical adjust button and a horizontal adjust button for selecting and adjusting the function control targets, an OSD menu generation unit enabling respective level adjust directions of the function control targets to be displayed vertically or horizontally, and a control unit enabling a disposed direction of the vertical adjust button or the horizontal adjust button, a level adjust display direction for each of the function control targets and a vertical direction (position) or a horizontal direction (position) actually implemented on the screen with regard to the function control targets to correspond to each other, whereby the respective adjusting directions of level adjust buttons, the moving direction of OSD menu level meter and actual moving directions (positions) of function control targets implemented on the screen are in accordance with each other.

35 Claims, 7 Drawing Sheets

LEVEL ADJUST DISPLAY APPARATUS AND METHOD FOR ON-SCREEN DISPLAY MENU IN IMAGE DISPLAY DEVICE

BACKGROUND OF THE INVENTION

1. Field of the Invention

The present invention relates to an on-screen display (OSD) apparatus for an image display device such as TV, VCR, computer monitor, etc., and more particularly, to an improved level adjust display apparatus and method for an OSD menu in an image display device which displays respective function control targets for the image display device on a screen in the form of an OSD menu by corresponding an adjust direction of each of the function control targets to a moving direction of an OSD menu level meter, thereby enabling a user to easily control the function control targets using OSD level control buttons and an OSD menu level meter.

2. Description of the Background Art

In an image display device, general function control targets such as volume, brightness, contrast, horizontal size, horizontal position, vertical size, vertical position, etc., which are included in OSD menus, are displayed on a screen, whereby a user can directly select and adjust an OSD menu item from the screen while visually confirming the adjustment.

FIG. 1 is a schematic front view illustrating an OSD menu control button installation of a conventional image display device, and FIG. 2 is a partially enlarged view detailing a control panel in FIG. 1.

As shown in FIG. 1, the image display device includes a Braun tube 1, a cabinet 2 and a control panel 3 disposed on the front side of the cabinet 2. The control panel 3 includes a level adjust button 4 for adjusting the OSD menu level on the screen, and a set/complete button 7 for setting the OSD menu and completing the menu setting. The level adjust button unit 4 includes a level increase button 5 and a level decrease button 6 disposed at each side thereof, serving to increase or decrease the menu level.

Initially, when the set/complete button 7 is pressed, the OSD menu is displayed on the screen.

FIGS. 3A through 3F respectively show OSD menus with regard to function control targets according to the conventional art, wherein FIG. 3A shows an OSD menu for contrast, FIG. 3B shows an OSD menu for brightness, FIG. 3C shows an OSD menu for horizontal size, FIG. 3D shows an OSD menu for horizontal position, FIG. 3E shows an OSD menu for vertical size, and FIG. 3F shows an OSD menu for vertical position. A rectangular pattern in the central OSD screen represents a level meter and its internal area represents a standard area. A thick colored portion in the standard area represents a variable histogram which horizontally fluctuates from the leftmost point thereof toward the right direction. A plurality of fixed indication items displayed adjacent to the level meter represent OSD menus for respective function targets. A shadowed item among the indication items indicates that the OSD menu item is selected.

Here, when a user presses the level increase button 5 or the level decrease button 6 of the level control button unit 4, the variable histogram accordingly fluctuates from the leftmost point toward the right side, whereby the user is allowed to recognize the level adjustment with regard to the selected function control target.

According to the control of the plurality of function control targets, the audio volume maximizes or minimizes, the screen contrast becomes clearer or dimmer and the screen brightness brightens or darkens. Likewise, the volume, contrast and brightness have nothing to do with the variation of size and position with regard to the screen, whereby the user can sufficiently recognize the respective adjustments through the size variation of the variable histogram of the level meter with regard to the corresponding function control targets.

However, in order to adjust the function control targets such as horizontal size, horizontal position, vertical size and vertical position, the horizontally variable OSD level meter and the level increase and decrease buttons 5, 6 horizontally disposed to control the function control targets are not suitable.

For example, in order to adjust the horizontal size, the variable histogram of the level meter moves toward one direction, that is, a horizontally single direction, thereby indicating only the horizontal fluctuation in correspondence to the variable diagram, whereas the real horizontal size of the screen image increases or decreases toward the left and right sides, that is, in both horizontal directions. Also, under the adjustment of the horizontal position of the screen image, the screen image is directed to move either toward the left or toward the right side. In case of the vertical size adjustment, the screen image elongates or shrinks vertically, and in case of vertical position adjustment, the screen image moves either upwardly or downwardly. Likewise, the actual function control targets change horizontally from left to right or vertically from top to bottom, whereas the variable histogram of the level meter corresponding to the function control targets only fluctuates horizontally, so that the movement of the variable histogram of the level meter does not match with the variation direction of the real screen image.

Moreover, since the level increase button 5 and the level decrease button 6 are also horizontally disposed, although the buttons 5, 6 correspond to the variable histogram of the level meter in disposition, the buttons 5, 6 do not correspond to the actual moving direction of the screen image. Therefore, when a user needs to change the screen image vertical size or position, it must be remembered which one of the two buttons 5, 6 is for the upward adjustment or downward adjustment.

Consequently, since the level meter function according to the conventional art is not designed on the basis of biotechnics, it may be difficult for a user to recognize the real variation on the screen by pressing the increase or decrease button 5, 6, especially in an image display device wherein an OSD menu is not displayed on its screen. In other words, it may confuse the user, instead of offering convenience.

SUMMARY OF THE INVENTION

The present invention is directed to overcoming the disadvantages of the conventional level adjust display apparatus and method for an OSD menu in an image display device.

Therefore, it is an object of the present invention to provide a level adjust display apparatus and method for an OSD menu in an image display device which overcomes the conventional disagreement between the adjusting direction by a level adjust button and the moving direction of a level meter being displayed on an OSD screen.

It is another object of the present invention to provide a level adjust display apparatus and method for an OSD menu in an image display device which corresponds respective adjusting directions of level adjust buttons, moving directions of OSD menu level meter and actual moving directions (positions) of function control targets on the screen to each other.

To achieve the above-described objects, there is provided a level adjust display apparatus for an OSD menu in an image display device according to the present invention which includes a key input means including a vertical adjust button and a horizontal adjust button for selecting and adjusting the function control targets, an OSD menu generation means enabling respective level adjust directions of the function control targets to be displayed vertically or horizontally, and a control means enabling a disposed direction of the vertical adjust button or the horizontal adjust button, a level adjust display direction for each of the function control targets and a vertical direction (position) or a horizontal direction (position) actually implemented with regard to the function control targets to correspond to each other on the screen.

Further, to achieve the above-described object, there is provided a level adjust display method for an OSD menu of an image display device according to the present invention which includes the steps of receiving a command signal for adjusting the function control targets in accordance with the manipulation of a vertical adjust button or a horizontal adjust button, determining a value of the command signal and outputting a control signal and a control data in accordance with the determined value, and displaying an OSD menu including an invariable or static display pattern and a variable moving display pattern on the screen in accordance with the control signal and the control data, wherein a disposed direction of the vertical adjust button or the horizontal adjust button, a variation direction of the variable or moving display pattern and a screen image variation direction (position) actually implemented on the screen correspond to each other.

The features and advantages of the present invention will become more readily apparent from the detailed description given hereinafter. However, it should be understood that the detailed description and specific example, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become better understood with reference to the accompanying drawings which are given only by way of illustration and thus are not limitative of the present invention, wherein.

DETAILED DESCRIPTION OF THE PREFERRED EMBODIMENTS

Figure 1:
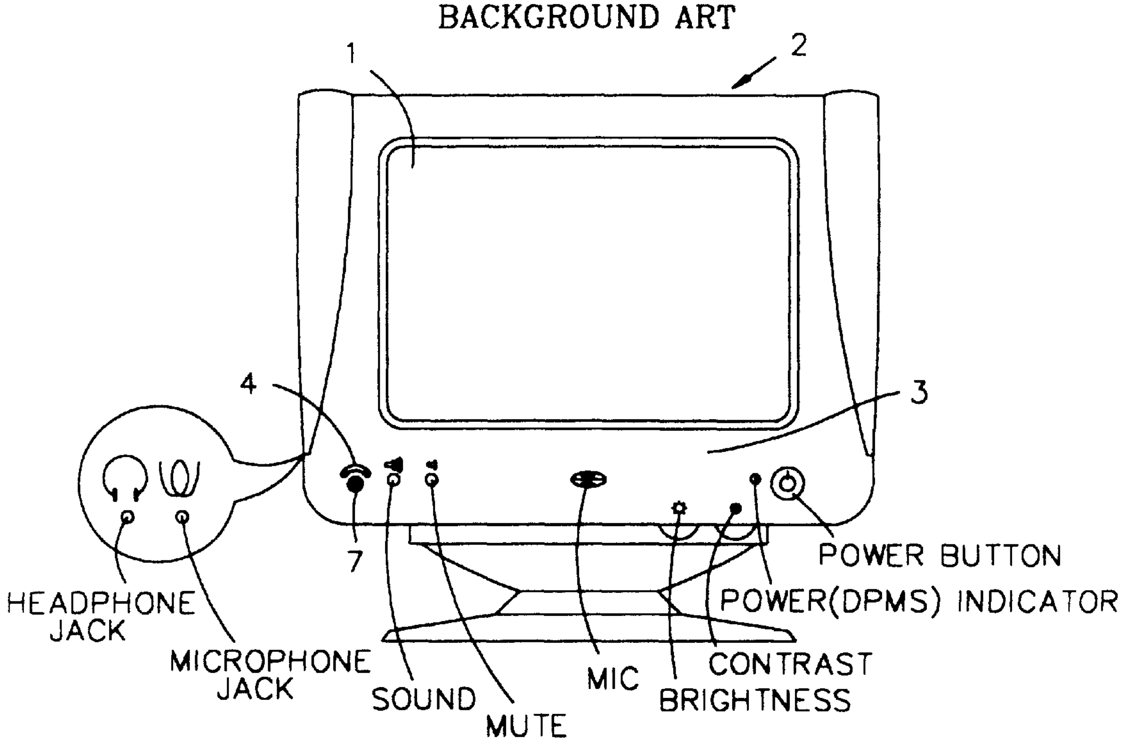
FIG. 1 BACKGROUND ART
FIG. 1 is a schematic front view illustrating an installation state of conventional OSD menu control buttons of an image display device.
Figure 2:
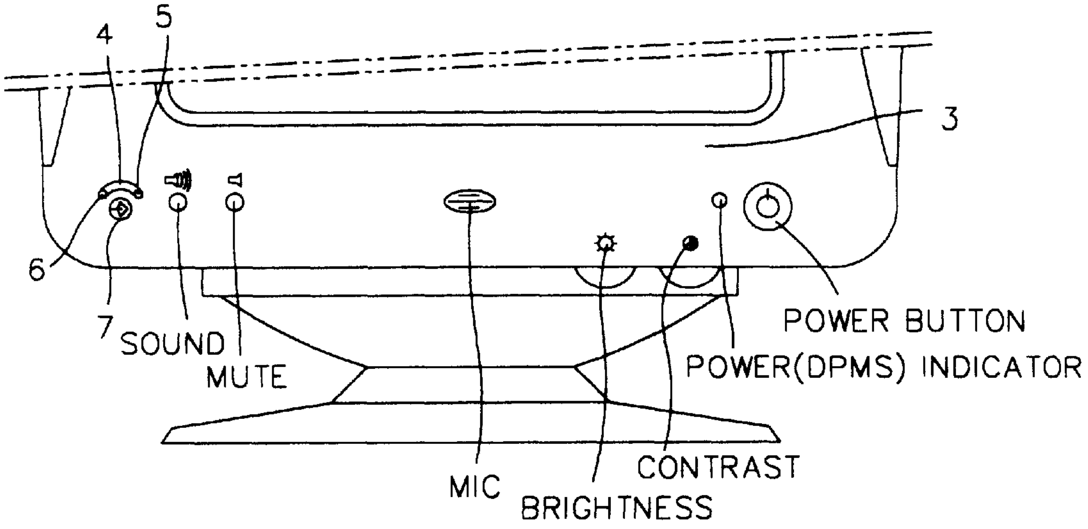
FIG. 2 BACKGROUND ART
FIG. 2 is an enlarged view detailing a control panel in FIG. 1.
Figure 3A:
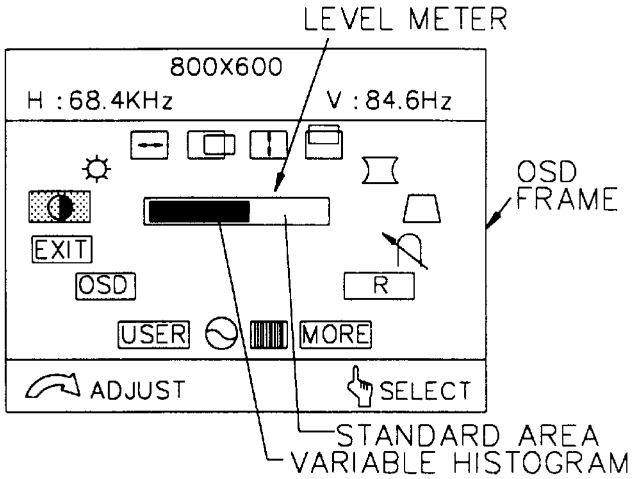
FIG. 3A BACKGROUND ART
FIGS. 3A through 3F are views respectively illustrating OSD menus being displayed on a screen in correspondence to a plurality of function control targets according to the conventional art.
Figure 3B:
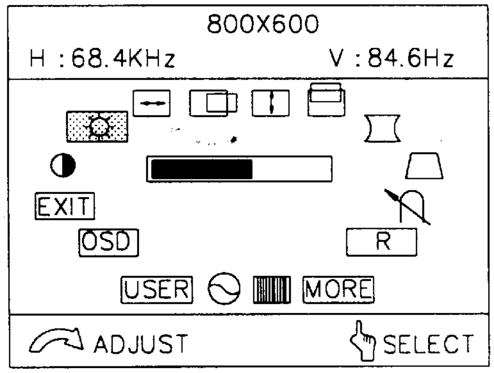
FIG. 3B BACKGROUND ART
Figure 3C:
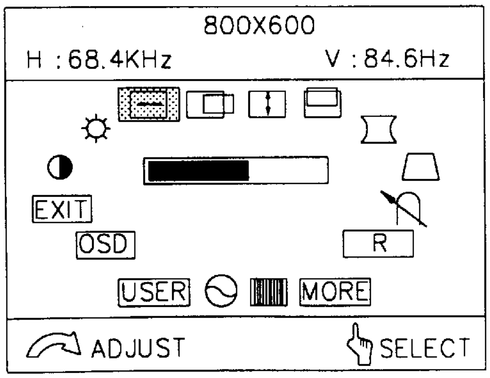
FIG. 3C BACKGROUND ART
Figure 3D:
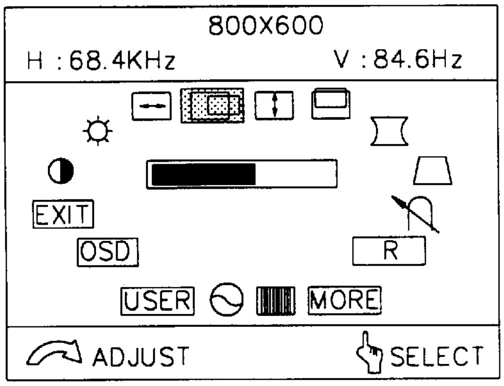
FIG. 3D BACKGROUND ART
Figure 3E:
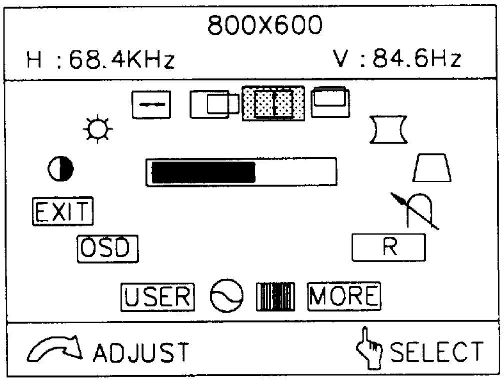
FIG. 3E BACKGROUND ART
Figure 3F:
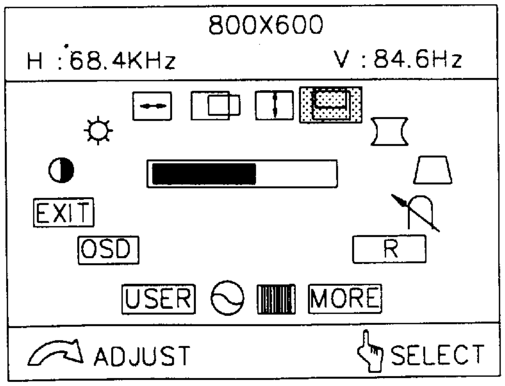
FIG. 3F BACKGROUND ART
Figure 4:
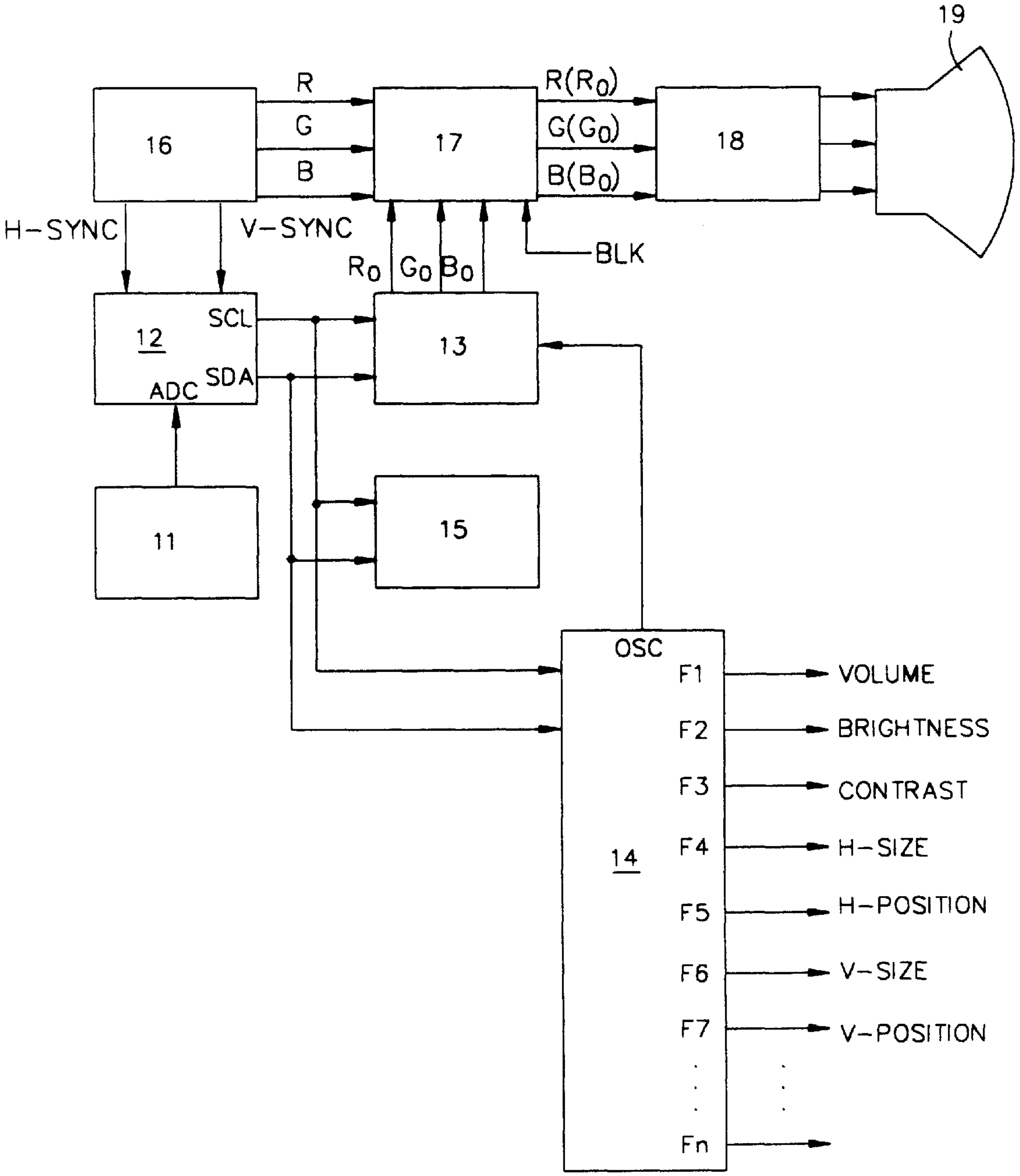
FIG. 4 is a block diagram illustrating a level control apparatus for an OSD menu of an image display device according to the present invention.

FIG. 4 is a block diagram illustrating a level control apparatus for an OSD menu of an image display device according to the present invention. As shown therein, the apparatus includes a key input unit 11, a control unit 12, an OSD menu generation unit 13, an analog/digital converter 14, a storage unit 15, an image signal output unit 16, a pre-amplifier 17, an image output unit 18, and a CRT (cathode ray tube) 19.

Specifically, the key input unit 11 outputs a command signal for selectively controlling respective control targets of the image display device in accordance with the manipulation of control keys by a user. The control unit 12 determines horizontal and vertical sync signals H-Sync, V-Sync from the image signal output unit 16 and outputs a control signal and control data so as to display the user-selected OSD menu on the screen in accordance with the command signal. The OSD menu generation unit 13 receives the control signal and the control data and outputs OSD image signals Ro, Bo, Go corresponding to the respective function control targets, thereby displaying the selected function control target on the screen as an OSD menu. The analog/digital converter 14 outputs analog signals corresponding to the respective function control targets in accordance with the control signal and the control data. The storage unit 15 stores therein the control data. The image signal output unit 16 outputs image signals R, G, B and the horizontal and vertical synchronous signals H-Sync, V-sync. The pre-amplifier 17 converts the image signals R, G, B and the OSD image signals Ro, Go, Bo to predetermined levels and outputs the resultant values in accordance with a blanking signal BLK. The image output unit 18 amplifies and outputs the converted image signals R, G, B, Ro, Go, Bo. The CRT 19 serving as a display member displays the image signals R, G, B, Ro, Go, Bo from the image output unit 18.

Figure 5:
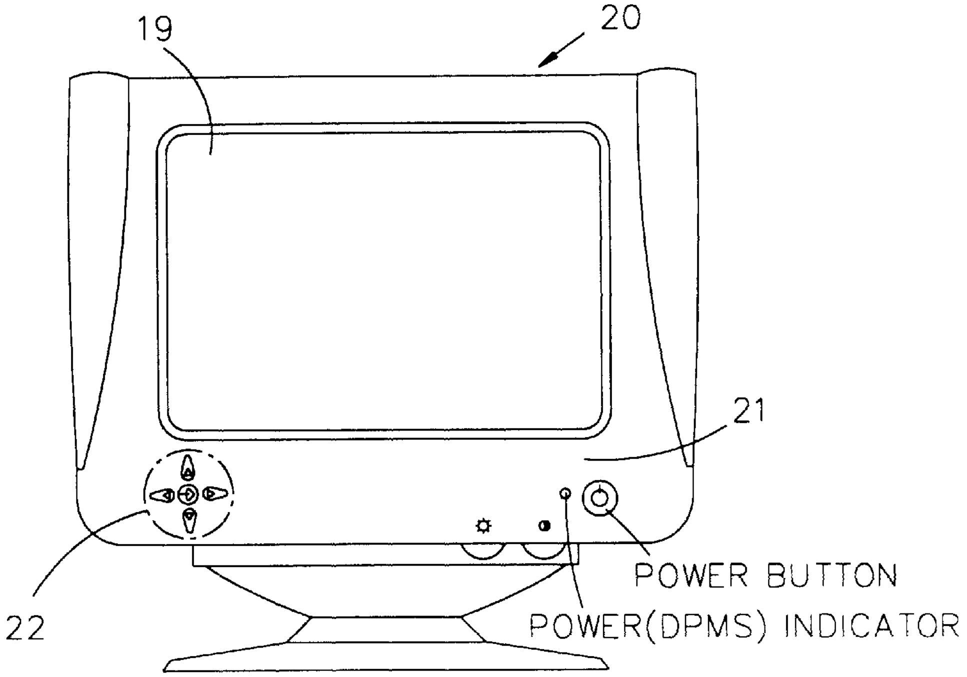
FIG. 5 is a schematic front view illustrating an installation state of OSD menu control buttons of an image display device according to the present invention.
Figure 6:
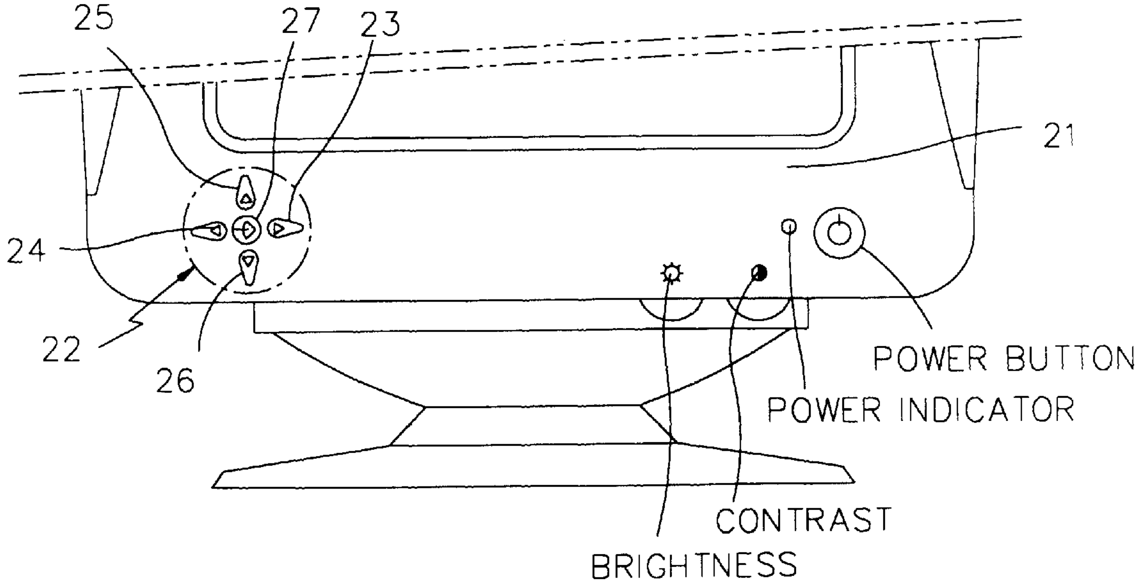
FIG. 6 is an enlarged view detailing a control panel in FIG. 5.

FIG. 5 is a schematic front view illustrating an installation state of OSD menu control buttons of an image display device according to the present invention, and FIG. 6 is an enlarged view detailing a control panel in FIG. 5.

A cabinet 20 shown in FIG. 5 includes a control panel unit 21. The control panel unit 21 includes a level control button unit 22 for selecting and adjusting a required function among the respective function control targets of the image display device by a user. The level control button unit 22 corresponds to the key input unit 11

As shown in FIG. 6, the level control button unit 22 includes a pair of horizontal control buttons 23, 24 horizontally disposed to horizontally control the function control targets, a pair of vertical control buttons 25, 26 vertically disposed to vertically control the function control targets, and a set/complete button 27 disposed in the center of the control buttons 23, 24, 25, 26 and for selecting and storing the function control targets.

Meanwhile, the key input unit 11 may be implemented using a remote controller serving as the control panel unit 21. Also, the image signal output unit 16 may be implemented using a keyboard of a PC (personal computer).

The OSD menu generation unit 13 displays at least one of respective menu indicators such as characters, abstract characters, numbers, diagrams, symbols, etc., on the OSD screen in an invariable or static pattern in accordance with the control signal and the control data, and also displays a varied magnitude of the selected function control target on the screen in a variable or moving pattern. The OSD menu is designed so as to be displayed on the screen of the CRT 19 during an OSD masking.

Figure 7A:
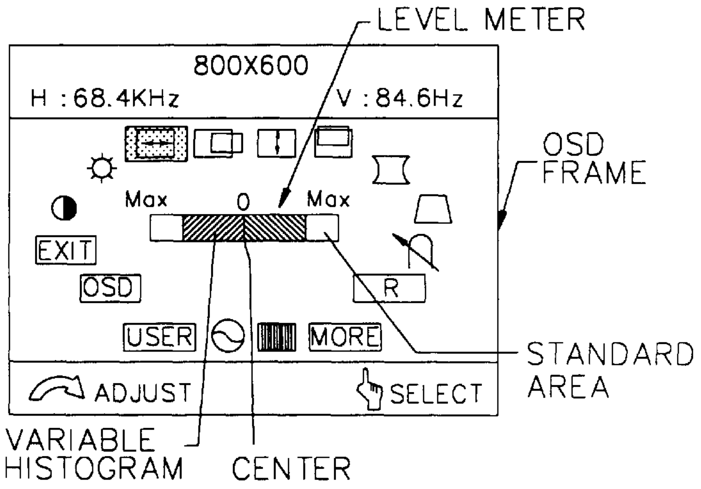
FIGS. 7A through 7F are views respectively illustrating OSD menus being displayed on a screen in correspondence to a plurality of function control targets according to the present invention.
Figure 7B:
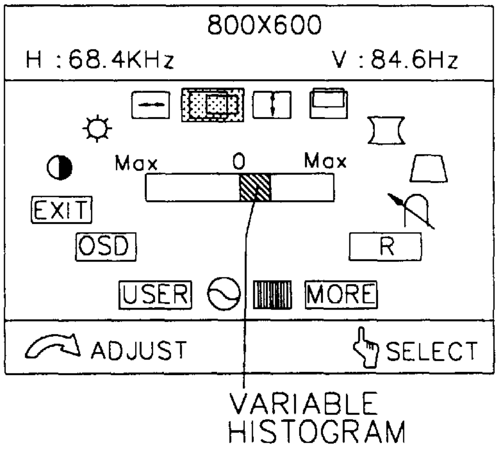
Figure 7C:
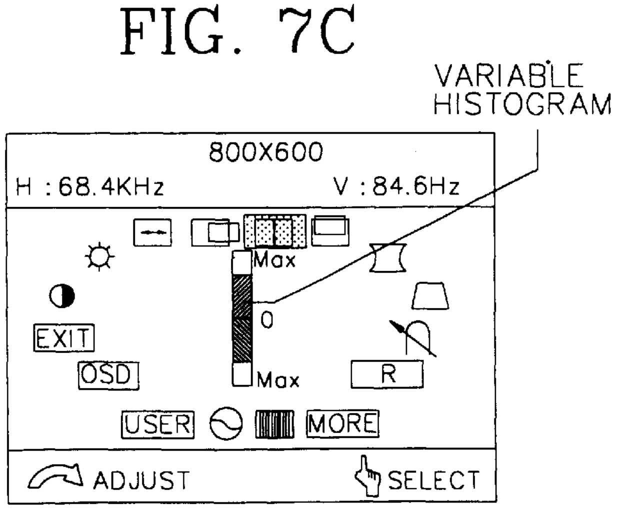
Figure 7D:
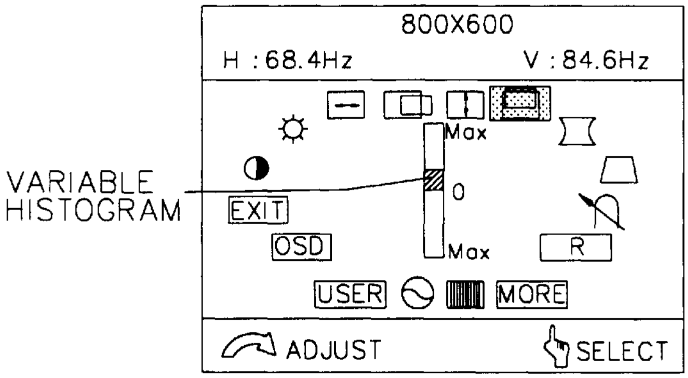
Figure 7E:
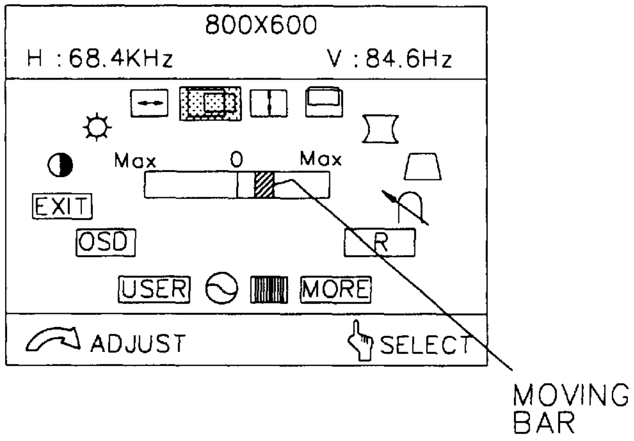
Figure 7F:
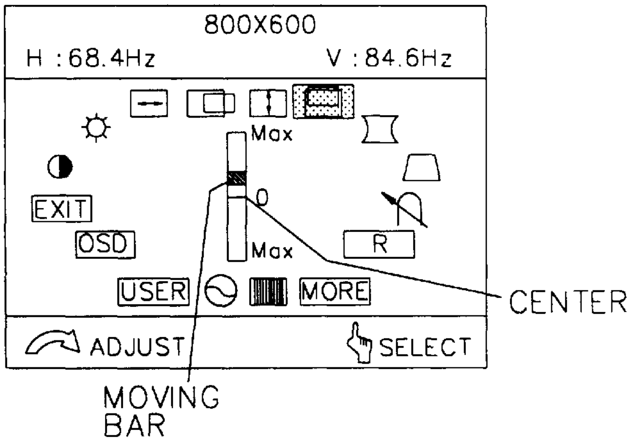

FIGS. 7A through 7F respectively show OSD menus with regard to the respective function control targets according to the preferred embodiment of the present invention, wherein FIG. 7A shows an OSD menu with regard to an image horizontal size using a moving histogram, FIG. 7B shows an OSD menu with regard to an image horizontal position using a moving histogram, FIG. 7C shows an OSD menu with regard to an image vertical size using a moving histogram, FIG. 7D shows an OSD menu with regard to an image vertical position using a moving histogram, FIG. 7E shows an OSD menu with regard to an image horizontal position using a moving bar, and FIG. 7F shows an OSD menu with regard to an image vertical position using a moving bar.

The rectangular form disposed in the center of the OSD menu screen is a level meter. The variable or moving indicator of the level meter is represented in the form of a variable histogram or a moving bar depending upon the function control targets. The OSD menu is displayed on a portion of the screen and its formation differs depending upon the type of a image display device. Such level indicators including a invariable or static type and a variable or moving type may be appropriately displayed in a variety of combinations, so that a user can select the displayed OSD menu while visually confirming the level meter and adjust the key input unit 11 so as to adjust the function control target corresponding to the OSD menu.

The control unit 12 includes a microcomputer and the storage unit 15 includes an EEPROM (electrically erasable programmable read only memory).

With reference to FIGS. 4 through 7F, the operation of the level adjust display apparatus for an OSD menu in an image display device according to the present invention will now be described.

The image signal output unit 16 outputs the image signals R, G, B to the pre-amplifier 17, and the vertical and horizontal sync signals H-Sync, V-Sync to the control unit 12. The pre-amplifier 17 converts the image signals R, G, B to appropriate levels and outputs the converted values to the image output unit 18. The converted image signals R, G, B are amplified by the image output unit 18 and applied to the CRT 19, thereby displaying the image on the screen. This is a typical step in which its OSD menu is not displayed.

In order to control the function control targets, a user presses the set/complete button 27 of the level control button unit 22 disposed on the front side of the cabinet 20 so as to display the OSD menu on the screen. The key input unit 11 outputs an analog command signal having a predetermined value to an analog/digital converter (ADC) of the control unit 12. The control unit 12 converts the analog command signal to a digital signal and outputs the control signal through a serial clock line (SCL) and also outputs the control data through the serial data line (SDL). The output control signal and the control data are applied to the OSD generation unit 13 and the digital/analog converter 14, whereby the OSD menu is displayed on the screen and a user is able to control the selected function control target while visually confirming the function control target.

The digital/analog converter 14 converts the horizontal and vertical sync signals H-Sync, V-Sync, the control signal and the control data to analog signals, and outputs analog signals with regard to the function control targets such as volume, brightness, contrast, horizontal size, horizontal position, vertical size, vertical position, etc., to a plurality of function control output terminals F1–Fn, respectively. Also, an oscillation frequency is adjusted in accordance with the horizontal and vertical sync signals H-Sync, V-Sync and outputted to the terminal OSC.

The OSD generation unit 13 outputs the OSD image signals Ro, Go, Go to the pre-amplifier 17, and the OSD image signals Ro, Go, Bo are converted to predetermined levels in the pre-amplifier 17 and amplified by the image output unit 18 and displayed on the CRT 19, so that an OSD menu corresponding to the OSD image signals Ro, Go, Bo is displayed on the screen. The displayed OSD menu includes characters, abstract characters, numbers, diagrams, symbols, etc., and at least one of them is represented in an invariable or static pattern. Meanwhile, the control data is stored in the storage unit 15.

A user views the displayed OSD menu and selects one of the plurality of function control targets. In order to adjust the selected function control target, one of the horizontal adjust buttons 23, 24 or the vertical adjust buttons 25, 26 is manipulated. According to the manipulation, the key input unit 11 outputs the command signal having a predetermined value to the control unit 12 and the analog/digital converter 14 converts the level of one selected from the plurality of function control targets in accordance with the control signal and the control data from the control unit 12, and this converted value is outputted to a function adjust output terminal among the plurality of function adjust output terminals F1—Fn.

The OSD generation unit 13 outputs the OSD image signals Ro, Go, Bo in accordance with the control signal and the control data, and the OSD image signals Ro, Go, Bo are processed by the pre-amplifier 17 and the image output unit 18 and displayed on the CRT 19, whereby the variable histogram of the level meter fluctuates horizontally and vertically, or the bar moves horizontally and vertically.

Accordingly, the user views the variation of the selected display pattern from the OSD menu while concurrently adjusting the selected function control target on the screen, and can adjust other function control targets in succession. When the adjustment is determined to have been completed, the set/complete button 27 is pressed again and the control data with regard to the adjustment-completed function control targets are stored in the storage unit 15. The stored control data is employed again when a user next needs to adjust the corresponding function control target.

When a size adjusting function is selected to adjust the OSD frame size in the OSD menu displayed on the CRT 19, the invariable or static pattern, and the variable or moving pattern fluctuate in an identical proportion to each other with regard to their size.

Referring to FIGS. 7A through 7F, a mutual relation between the variations of the function control targets and the OSD menu indication patterns corresponding to the respective function control targets will now be described.

As shown in FIG. 7A, in order to adjust a horizontal size of the screen image using the variable histogram, a user selects a horizontal size item among the plurality of function control targets of the OSD menu in a state in which the OSD menu is displayed on the screen of the CRT 19. In order to adjust the selected function control target, the horizontal adjust buttons 23, 24 are pressed and then the variable histogram in the horizontal level meter horizontally increases from the center thereof serving as a start point (0) toward the left and right directions up until the end points Max or decreases from the end points Max toward the center serving as the start point (0). At this time, the increase or decrease of the variable histogram is continuously carried out. Likewise, the horizontal adjust buttons 23, 24 are horizontally disposed to the right and to the left of the set/complete button 27, and according to the manipulation by a user the variable histogram increases or decreases horizontally. Accordingly, since the actual horizontal size of the screen image corresponds to the increase or decrease direction of the variable histogram of the level meter, a user can easily recognize the function control status of the image display device.

Also, as shown in FIG. 7B, in order to adjust the horizontal position of the screen image using the variable diagram of the level meter, a user selects a horizontal position item and presses the horizontal adjust buttons 23 or 24. Then, the variable histogram of the horizontal level meter horizontally increases from the center thereof serving as a start point (0) in the standard area toward the left or right directions up until the end points Max or decreases from the end points Max toward the center serving as the start point (0). At this time, the increase or decrease of the variable histogram is continuously carried out. The actual horizontal position of the screen image moves to the right or left in accordance therewith.

As shown in FIG. 7C, in order to adjust the vertical size of the screen image using the variable diagram of the level meter, a user presses the vertical adjust buttons 25, 26 and the variable histogram of the vertical level meter vertically increases from the center thereof serving as a start point (0) in the standard area toward the top and bottom directions until the end points Max or decreases from the end points Max toward the center serving as the start point (0). Likewise, the vertical adjust buttons 25, 26 are vertically disposed from the set/complete button 27. In accordance with the manipulation by the user, the variable histogram vertically increases or decreases and accordingly the actual vertical size of the screen image moves to the top or bottom in accordance therewith, whereby the user can easily recognize the function control status of the image display device.

As shown in FIG. 7D, in order to adjust the vertical position of the screen image using the variable diagram of the level meter, a user presses the vertical adjust buttons 25 or 26 and the variable histogram of the vertical level meter vertically increases from the center thereof serving as a start point (0) in the standard area toward the top or bottom directions until the end point Max or decreases from the end point Max toward the center serving as the start point (0). Likewise, the vertical adjust buttons 25, 26 are vertically disposed from the set/complete button 27. As the variable histogram vertically increases or decreases, the actual vertical position of the screen image moves toward the top or bottom in accordance therewith.

Meanwhile, the variable histogram of the level meter is displayed in color and brightness identical to those of the selected invariable or static indication patterns, and the color, brightness and pattern of the variable histogram can be adjusted through the key input unit 11 when required by a user.

Also, in order to clearly distinguish the selected invariable or static indication type from the other unselected invariable or static indication types, their color, brightness and pattern can be differentiated or provided in a flickering type.

As shown in FIG. 7E, in order to adjust the horizontal position of the screen image using a moving bar, a user presses the horizontal adjust buttons 23 or 24 and the position of the moving bar of the horizontal level meter moves horizontally from the center thereof serving as a start point (0) in the standard area toward either the right end point Max or the left end point Max. The actual horizontal position of the screen image moves either toward the left direction or toward the right direction. Likewise, the horizontal adjust buttons 23, 24 are horizontally disposed from the set/complete button 27 and the moving bar horizontally moves in accordance with the manipulation of the user. Since the actual shift of the horizontal position of the screen image corresponds to the moving direction of the moving bar, the user can easily recognize the function control status of the image display device as desired.

As further shown in FIG. 7F, in order to adjust the vertical position of the screen image using the moving bar, a user presses the vertical adjust buttons 25, 26 and the position of the moving bar of the vertical level meter vertically moves from the center thereof serving as a start point (0) in the standard area toward either the top or the bottom direction until the top end point Max or the bottom end point Max. Accordingly, the actual vertical position of the screen image moves either upwardly or downwardly in accordance therewith.

Meanwhile, the moving bar of the level meter is displayed in a color and brightness identical to those of the selected invariable or static indication patterns, and the color, brightness and pattern of the moving bar can be adjusted through the key input unit 11 when required by a user.

Also, in order to clearly distinguish the selected invariable or static indication type from the other unselected invariable or static indication type, their color, brightness and pattern can be differentiated or provided in a flickering type.

As described above, the level adjust display apparatus for an OSD menu in an image display device according to the present invention enables a manipulation direction of the plurality of level increase/decrease buttons and the variation direction of the variable or moving indication pattern to correspond to the actual variation direction of the screen image, thereby facilitating the OSD menu adjustment in terms of a biotechnical view.

As the present invention may be embodied in several forms without departing from the spirit of essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within meets and bounds of the claims, or equivalences of such meets and bounds are therefore intended to embrace the appended claims.

What is claimed is:

1. A level adjust display apparatus for an on-screen display (OSD) menu of an image display device which displays function control targets in the form of an OSD menu on a screen, comprising:

a key input means including a vertical adjust button and a horizontal adjust button for selecting and adjusting the function control targets;

an OSD menu generation means enabling respective level adjust directions of the function control targets to be displayed vertically or horizontally; and a control means enabling a disposed direction of the vertical adjust button or the horizontal adjust button, a level adjust display direction for each of the function control targets and a vertical direction and position or a horizontal direction and position actually implemented with regard to the function control targets to correspond to each other on the screen.

2. The apparatus of claim 1, wherein a direction or a size of each of the function control targets is vertically adjusted in accordance with a user's manipulation of the vertical adjust button, and horizontally adjusted in accordance with a user's manipulation of the horizontal adjust button.

3. The apparatus of claim 1, wherein the key input means further comprises a set/complete button disposed centrally of the horizontal and vertical adjust buttons.

4. The apparatus of claim 1, wherein the key input means comprises at least one selected from a control panel unit provided in the image display device, a keyboard of a PC (personal computer) and a remote controlling means.

5. The apparatus of claim 1, wherein the OSD menu generation means displays at least one selected from a character, an abstract character, a number, a diagram and a symbol on the screen in the form of an invariable or static display pattern, and at least one of a variable histogram and a moving bar is displayed on the screen in the form of a variable or moving display pattern.

6. The apparatus of claim 5, wherein the invariable or static display pattern and the variable or moving display pattern are displayed in the same color or in different colors.

7. The apparatus of claim 5, wherein the invariable or static display pattern is provided to be flickering so as to distinguish the same from the variable or moving display pattern.

8. The apparatus of claim 5, wherein the respective sizes of the invariable or static display pattern and the variable or moving display pattern are varied in the same proportion when an OSD frame size is adjusted from the OSD menu.

9. The apparatus of claim 5, wherein the variable or moving display pattern moves from a center thereof serving as a start point within a standard area or varies a lineal magnitude thereof.

10. The apparatus of claim 5, wherein the variable histogram vertically or horizontally moves from a center thereof serving as a start point within a standard area.

11. The apparatus of claim 5, wherein the moving bar moves from a center thereof serving as a start point within a standard area toward one of a left end and a right end or toward one of a top end and a bottom end.

12. The apparatus of claim 5, wherein a figure, a color or a brightness of the variable histogram is adjustable.

13. The apparatus of claim 5, wherein the variable histogram varies within the standard area designated and has the same color, brightness and figure as those of the selected invariable or static display pattern.

14. The apparatus of claim 5, wherein the variable histogram varies from a center thereof serving as a start point within the standard area designated and has the same color, brightness and figure as those of the selected invariable or static display pattern.

15. The apparatus of claim 5, wherein the variable histogram continuously increases in size without interruption.

16. A level adjust display method for an on-screen display (OSD) menu of an image display device which displays function control targets in the form of an OSD menu on a screen, comprising the steps of:

receiving a command signal for adjusting the function control targets in accordance with the manipulation of a vertical adjust button or a horizontal adjust button;

determining a value of the command signal and outputting a control signal and control data in accordance with the determined value; and displaying an OSD menu including an invariable or static display pattern and a variable moving display pattern on the screen in accordance with the control signal and the control data;

wherein a disposed direction of the vertical adjust button or the horizontal adjust button, a variation direction of the variable or moving display pattern and a screen image variation direction and position actually implemented on the screen correspond to each other.

17. The method of claim 16, wherein a direction or a size of each of the function control targets is vertically adjusted in accordance with a user's manipulation of the vertical adjust button, and horizontally adjusted in accordance with a user's manipulation of the horizontal adjust button.

18. The method of claim 16, wherein the command signal is received using at least one selected from a control panel unit provided in the image display device, a keyboard of a PC and a remote controlling means.

19. The method of claim 16, wherein at least one selected from a character, an abstract character, a number, a diagram and a symbol is displayed on the screen in the form of the invariable or static display pattern, and at least one of a variable histogram and a moving bar is displayed on the screen in the form of the variable or moving display pattern.

20. The method of claim 19, wherein the variable histogram continuously increases in magnitude without interruption.

21. A level adjust display apparatus for an on-screen display (OSD) menu of an image display device which displays function control targets in the form of an OSD menu on a screen, comprising:

a key input means including a vertical adjust button and a horizontal adjust button for selecting and adjusting the function control targets;

a control means for outputting a control signal and control data corresponding to a manipulation of the key input means; and an OSD menu generation means for receiving the control signal and the control data, outputting an OSD image signal corresponding to the function control targets and displaying the function control targets on the screen for the OSD menu; and wherein a disposed direction of the vertical adjust button and the horizontal adjust button, a level adjust display direction for each of the function control targets and a vertical direction and position or a horizontal direction and position actually implemented on the screen with regard to the function control targets correspond to each other.

22. The apparatus of claim 21, wherein a direction or a size of each of the function control targets is vertically adjusted in accordance with a user's manipulation of the vertical adjust button, and horizontally adjusted in accordance with a user's manipulation of the horizontal adjust button.

23. The apparatus of claim 21, wherein the key input means further comprises a set/complete button disposed centrally of the horizontal and vertical adjust buttons.

24. The apparatus of claim 21, wherein the key input means comprises at least one selected from a control panel unit provided in the image display device, a keyboard for a PC and a remote controlling means.

25. The apparatus of claim 21, wherein the OSD menu generation means displays at least one selected from a character, an abstract character, a number, a diagram and a symbol on the screen in the form of an invariable or static display pattern, and at least one of a variable histogram and a moving bar is displayed on the screen in the form of a variable or moving display pattern.

26. The apparatus of claim 25, wherein the variable histogram continuously increases in magnitude without interruption.

27. The apparatus of claim 6, wherein the variable histogram continuously increases in size without interruption.

28. The apparatus of claim 7, wherein the variable histogram continuously increases in size without interruption.

29. The apparatus of claim 8, wherein the variable histogram continuously increases in size without interruption.

30. The apparatus of claim 9, wherein the variable histogram continuously increases in size without interruption.

31. The apparatus of claim 10, wherein the variable histogram continuously increases in size without interruption.

32. The apparatus of claim 11, wherein the variable histogram continuously increases in size without interruption.

33. The apparatus of claim 12, wherein the variable histogram continuously increases in size without interruption.

34. The apparatus of claim 13, wherein the variable histogram continuously increases in size without interruption.

35. The apparatus of claim 14, wherein the variable histogram continuously increases in size without interruption.

* * * * *